United States Patent [19]

Helden et al.

[11] 3,728,414
[45] Apr. 17, 1973

[54] OLEFIN DISPROPORTIONATION

[75] Inventors: Robert Van Helden; Charles F. Kohll; Pieter A. Verbrugge, all of Amsterdam, Netherlands

[73] Assignee: Shell Oil Company, New York, N.Y.

[22] Filed: Sept. 14, 1970

[21] Appl. No.: 72,161

[30] Foreign Application Priority Data

Feb. 27, 1970 Netherlands ....................... 7002795

[52] U.S. Cl. ........ 260/683 D, 260/666 A, 260/668 R, 260/677 R, 260/680 R
[51] Int. Cl. ................................................. C07c 3/62
[58] Field of Search ..................... 260/683 D, 666 H, 260/677, 680, 668

[56] References Cited

UNITED STATES PATENTS

| | | | |
|---|---|---|---|
| 3,424,813 | 1/1969 | Breckoff et al. | 260/683.2 |
| 3,261,879 | 7/1966 | Banks | 260/683 |
| 3,457,320 | 7/1969 | Stapp et al. | 260/683 |
| 3,554,924 | 1/1971 | Kittleman et al. | 260/683 |

FOREIGN PATENTS OR APPLICATIONS 1,096,200  12/1967  Great Britain ....................... 260/683

*Primary Examiner*—Delbert E. Gantz
*Assistant Examiner*—C. E. Spresser
*Attorney*—Howard W. Haworth and Martin S. Baer

[57] ABSTRACT

Olefins are disproportionated in the presence of a novel catalyst composition comprising (*a*) a conventional olefin disproportionation catalyst, (*b*) a Group IIIa metal, Group IIIa metal compound or mixtures thereof and (*c*) a carrier of at least 75 percent alumina. The novel catalyst has a long catalytic lifetime and good disproportionation activity.

6 Claims, No Drawings

OLEFIN DISPROPORTIONATION

BACKGROUND OF THE INVENTION

Reactions of olefinic molecules in the presence of metal-containing catalysts to produce other olefinic molecules are known in the art as "disproportionation." A typical olefin disproportionation process is illustrated by U.S. Pat. No. 3,261,879, issued July 19, 1966, to Banks, wherein two similar molecules of an olefin react in the presence of certain catalysts to produce one olefin of a higher carbon number and one olefin of a lower carbon number. For example, propylene disproportionates by the process of U.S. Pat. No. 3,261,879 to produce ethylene and butylenes.

A variation of this olefin disproportionation process, which might be termed "reverse disproportionation" is illustrated by the Netherlands Patent application 6514985 of British Petroleum Company, Limited, published May 20, 1966, wherein, in one modification, molecules of two dissimilar olefins are reacted to form two molecules of a single olefin product, e.g., ethylene and 2-butene react to form propylene.

Another variation of the process, being conveniently termed "ring opening disproportionation" to distinguish it from other variations, is disclosed by U.S. Pat. No. 3,424,811 of Shell Oil Company, issued Jan. 28, 1969, wherein a cyclic olefin and an acyclic olefin react to form a single product molecule. For example, ethylene reacts with cyclopentene by ring opening disproportionation to produce 1,6-heptadiene.

The term "olefin disproportionation process" as herein employed is meant to include all variations of olefin disproportionation reactions.

A variety of catalysts have been employed for olefin disproportionation reactions. One type of olefin disproportionation catalyst is that of Turner et al., British Pat. No. 1,054,864, which comprises a supported heterogeneous catalyst composition of rhenium heptoxide on aluminum oxide. McGrath et al., British Pat. No. 1,159,056 disclose an olefin disproportionation catalyst composition comprising rhenium heptoxide on alumina modified with alkali or alkaline earth metal ions. Another olefin disproportionation catalyst is that of Phillips Petroleum Co., British Pat. No. 972,935, which comprises an oxide of molybdenum, an oxide of aluminum and, optionally, an oxide of cobalt. British Petroleum, British Pat. No. 1,096,200, use an olefin disproportionation catalyst comprising lanthanum oxide and alumina.

SUMMARY OF THE INVENTION

It has now been found that a novel catalyst, having long catalytic life and good activity in the catalysis of olefin disproportionation reactions, is obtained by modifying a conventional olefin disproportionation catalyst with a Group IIIa element of atomic number 21 to 71 inclusive, and compounds or mixture thereof.

DESCRIPTION OF PREFERRED EMBODIMENTS

The Olefinic Reactants. The process of the invention comprises contacting two olefinic reactants, which are the same or are different olefins, and are acyclic olefins or are cyclic olefins, in the presence of the novel catalyst composition of the invention.

One class of suitable acyclic olefinic reactants is represented by the fomula.(I):

wherein the R independently is hydrogen or alkyl of up to 19 carbon atoms with the total number of carbon atoms of the acyclic olefin, which total is herein termed "$n$," being no more than 40.

Illustrative of acyclic olefinic reactants represented by formula (I) are ethylene, propylene, 1-butene, 2-butene, isobutene, 2-pentene, 1-pentene, isopentene, 2-methylbutene-1, 2-methylbutene-2, 1-hexene, 2-hexene, 3-hexene, 2-methylpentene-1, 1-heptene, 2-decene, 6-dodecene, 3-tetradecene and 10-eicosene.

In general, the preferred acyclic olefins are olefins of up to 25 carbon atoms, more preferably of up to 15 carbon atoms, and especially preferred are linear acyclic internal monoolefins, i.e., those olefins wherein each atom of the carbon-carbon double bond is substituted with a single R group.

One class of suitable cyclic olefinic reactants is represented by formula (II)

wherein A is a divalent hydrocarbon moiety of from three to ten carbon atoms and of up to three ethylenic double bonds which are portions of carbocyclic rings and is selected so that the carbon atoms depicted in the formula (II) are members of a carbocyclic ring of at least five carbon atoms. The total number of carbon atoms of the cyclic olefinic reactant of formula (II) which total is herein termed "$m$", is therefore from five to twelve.

Illustrative monocyclic olefinic reactants of formula (II) include cyclopentene, cycloheptene, cyclooctene, cyclodecene, 1,5-cyclooctadiene, 1,6-cyclodecadiene and 1,5,9-cyclododecatriene, whereas illustrative polycyclic olefinic reactants are illustrated by bicyclo(2.2.1)hepta-2,5-diene, bicyclo(2.2.1)-hept-2-ene, tricyclo(4.2.1.0$^{2,5}$)non-7-ene, tricyclo(5.2.1.0$^{2,6}$)-deca-3,8-diene, bicyclo(2.2.2)oct-2-ene, bicyclo(2.2.2)octa-2,5-diene, bicyclo(3.3.0)oct-2-ene, dicyclopentadiene (3a,4,7,7a-tetrahydro-4,7-methanoindene), and quadricyclo-(2.2.1.2$^{2,6}$.0$^{3,5}$)non-8-ene. Particularly satisfactory results are obtained when the cyclic olefinic reactant is a monocyclic or a bicyclic olefinic reactant of up to two ethylenic linkages and most preferred are the monocyclic, monoolefinic reactants of from five to eight carbon atoms.

Another class of suitable olefinic reactants are polyolefinic compounds containing two or more non-conjugated double bonds. Illustrative polyolefins are poly-1,4-butadiene, poly-1,4-isoprene and a copolymer of styrene and butadiene.

An additional class of suitable olefinic reactants are alkenes of eight to 16 carbon atoms of the formula:

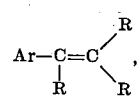

wherein Ar is an aromatic radical, preferably hydrocarbon aromatic of up to 10 carbon atoms, and the R groups are as defined above. Preferred compounds of this type are styrene and alpha-methylstyrene.

When two different olefinic reactants are employed in the disproportionation process, the molar ratio of one olefinic reactant to the other olefinic reactant is not critical, and up to a 20-fold excess, preferably up to a 10-fold excess of one olefinic reactant can be employed.

The Catalyst. The novel catalyst composition comprises (a) a conventional olefin disproportionation catalyst, (b) a Group IIIa metal or compound, or mixtures thereof, and (c) a carrier comprising at least 75 percent alumina.

A stable catalyst with a greatly increased catalytic lifetime is produced by modification of any conventional olefin disproportionation catalyst with a Group IIIa compound or element or a mixture of Group IIIa compounds or elements. The addition of the Group IIIa modifier can result in a tenfold or more increase in the active lifetime of the disproportionation catalyst. Typical olefin disproportionation catalysts are compounds of a metal with atomic number 22 to 25, 40 to 46, 50 and 72 to 77, that is, titanium, vanadium, chromium, manganese, zirconium, niobium, molybdenum, technetium, ruthenium, rhodium, palladium, tin, hafnium, tantalum, tungsten, rhenium, osmium and iridium. Compounds of molybdenum, tungsten, rhenium, iridium, and rhodium are particularly active with preference being given to molybdenum, tungsten and rhenium.

The compounds of a metal with atomic number 22 to 25, 40 to 46, 50 and 72 to 77 may be organic compounds. Thus, such a compound may consist of a salt of the metal concerned with an inorganic acid, or an organic acid, or an organic compound in which the metal concerned is part of a complex, for instance, a $\pi$-allyl complex. Preference is given to an inorganic compound of the metals with atomic numbers 22, to 25, 40 to 46, 50, 72 to 77, in particular to oxides, halides, sulphates, phosphates and/or carbonyl derivatives of molybdenum, tungsten and rhenium, oxides of niobium and tantalum and halides, sulphates and/or phosphates of titanium, zirconium, niobium and tantalum. Rhenium heptoxide is particularly satisfactory, because it promotes olefin disproportionation reactions at room temperatures.

Of course, it is possible to use mixtures of compounds of one or more of the metals with atomic numbers 22 to 25, 40 to 46, 50 and 72 to 77.

The modifying component used in the olefin disproportionation catalyst is an element of atomic number from 21 to 71 inclusive of Group IIIa of the Periodic Table or a compound of such metal, or mixture thereof. As employed herein, Group IIIa is defined by the long form of the Periodic Table of Mendeleev as reproduced in Cotton and Wilkinson, Advanced Inorganic Chemistry, 2nd Revised and Augmented Edition, Interscience Publishers, 1966. Preferred Group IIIa metals are lanthanum, cerium, praseodymium, neodymium, samarium, europium and gadolinium. Particularly active are cerium and europium. A mixture of rare earth metals in their naturally occurring amounts, herein designated as "didymium," is very satisfactory. These mixtures can be either rich or poor in cerium. In many types of didymium the most frequently occurring rare-earth metals are lanthanum and neodymium, while smaller amounts of praseodymium and samarium may also be present. In other types of didymium the most frequently occurring rare-earth metals are neodymium and samarium, while smaller amounts of praseodymium and gadolinium may also be present. By way of example the following analysis of a didymium mixture is given (%w): $La_2O_3$ 43%, $Nd_2O_3$ 36%, $Pr_6O_{11}$ 11%, $Sm_2O_3$ 5%, $Ce_2O_3$ 2%, and $Y_2O_3$ 1%.

The Group IIIa modifiers may be present on the carrier in the form of compounds, such as oxides, hydroxides and carbonates. In particular, oxides and hydroxides and other compounds of Group IIIa metals which can easily be converted into oxides have proved very suitable. The optimum content of Group IIIa within the catalyst depends in part on the specific Group IIIa metal. The lifetime of catalysts with too small an amount of Group IIIa metal on the carrier is relatively short. Catalysts with too large an amount of Group IIIa metal on the carrier have a relatively low disproportionation activity. In general, quantities are used in the range of from 0.05 to 5%w, calculated as Group IIIa metal on carrier. Preferred are quantities of from 0.2 to 2.5%w.

The carriers used in the process according to the present invention comprise at least 75% by weight alumina and may contain, in addition to aluminum oxide, other constituents, provided that the percentage of the other constituents, calculated on the weight of the total carrier, does not exceed the value of 25 percent by weight. The other constituents may be, for instance, titanium oxide, tin oxide, magnesium oxide, zirconium oxide, thorium oxide, silicon dioxide and/or phosphates of aluminium, zirconium, magnesium, titanium and/or calcium. Preferably, the carrier contains at least 95 percent by weight of aluminum oxide, because a higher content of aluminum oxide in the carrier is in general attended with a greater activity of the catalyst, while in addition the special advantages provided by the presence of the Group IIIa modifiers become more prominent.

The specific surface area and the specific pore volume of the carriers are not critical. As a rule, a specific surface area of from 1 to 800 m²/g and preferably of from 50 to 700 m²/g is preferred. The pore volume is in general between 0.1 and 0.6 ml/g carrier. The carriers may be prepared by techniques known in the art.

The quantities in which the catalysts are applied may vary within wide limits, the lower limit being set by the minimum quantity that provides just enough catalytic activity and the upper limit by the maximum quantity that the carrier can support. The maximum quantity mentioned depends on, among other things, the specific surface area and pore volume of the carrier. In general, quantities of catalysts in excess of 0.1 per cent by weight, calculated as metal on carrier, are very suitable. Usually, the catalysts are applied in a quantity of not more than 40 per cent by weight and preferably of not more than 20 per cent by weight, calculated as total metal on carrier.

In addition to the olefin disproportionation catalyst modified as described above, one or more other components may be present on the carrier, for example, coactivators, hydrogenating components, components for isomerization of the double bond, and the like.

Cobalt oxide is an example of a coactivator. Thus the combination of molybdenum oxide - cobalt oxide displays an increased disproportionation activity. Other suitable coactivators are compounds of iron, nickel, and bismuth, such as iron oxide, nickel oxide and bismuth oxide. The iron, nickel and cobalt coactivators have hydrogenating activity as well.

Some disproportionation catalysts also display hydrogenating activity such as catalytic compounds of manganese, palladium, rhodium or ruthenium. Other examples of hydrogenating components are manganese, palladium, rhodium, ruthenium, iron, cobalt, nickel and platinum. Suitable metal compounds with hydrogenating activity are, for instance, the oxides, sulphides, $\pi$-allyl or carbonyl derivatives of the above metals. In particular, palladium, platinum and nickel and organic and inorganic compounds of these three metals are very suitable hydrogenating components.

The presence of noble metals of Group VIII of the Periodic Table System of the Elements may also lead to isomerization of the double bond, particularly when platinum, palladium and ruthenium are present. Palladium is particularly active in this respect. (The term "isomerization"d refers to a shifting of the double bond in the molecule with preservation of the carbon skeleton.)

Coactivators, hydrogenating components and components for isomerization of the double bond, when utilized, are usually applied in a quantiy, calculated on carrier, smaller than that of the catalyst, for instance, between 0.05 and 15%w and in particular between 0.5 and 5%w.

The sequence in which the catalyst, coactivators, hydrogenating components, components for isomerization of the double bond and the Group IIIa metal are applied on the carriers is not critical; moreover, the use of co-activators, hydrogenating components and/or components for isomerization of the double bond is entirely optional and may be omitted. The group IIIa modifiers may therefore be applied on the carrier before, after or together with the catalysts, coactivators, hydrogenating components and/or components for isomerization of the double bond. It is also possible to apply first a coactivator, then the Group IIIa metals, then a hydrogenating component and a component for isomerization of the double bond and finally a catalyst.

The application of the various components may be made in any conventional manner. For instance, the carrier may be impregnated with an aqueous solution of a metal compound and then dried and subjected to a heat treatment. Impregnation may be effected in several stages with solutions of the same or different concentrations. Another possibility is to form an aqueous suspension of the compound to be applied, impregnate the carrier with this suspension and dry the impregnated carrier.

The heat treatment of the modified catalyst may be carried out at temperatures between 300°C and 750°C and for periods ranging from 3 to 10 hours. If desired, shorter or longer periods and/or lower and higher temperatures may be applied. Heat treatments in the presence of non-reducing inert gases, such as nitrogen, carbon dioxide or helium, or gas mixtures, such as air, as a rule cause an increase in the disproportionating activity of the catalyst, while heat treatments in the presence of a reducing atmosphere, such as that of hydrogen or mixtures of hydrogen with an inert diluent such as nitrogen, cause an increase in the hydrogenating activity.

During the heat treatment various changes in the composition are possible. Thus, cobalt, nitrate and ammonium paramolybdate may be converted into cobalt oxide and molybdenum oxide, perrhenates may be converted into rhenium oxide and carbonyl compounds may be converted into oxides. Changes in valency during the heat treatment may also occur.

If desired, the heat treatment may be carried out in various stages under different conditions, while any of the components may be added to the carrier in the meantime. It is recommended after the last addition to treat the catalyst to remove the free oxygen present in the carrier for the greater part and the adsorbed water as nearly completely as possible.

Rhenium heptoxide may be applied to the carrier via a gas phase. To this end, a hot gas may be passed over heated rhenium heptoxide and subsequently over the carrier, the temperatures of the oxide, the carrier and the gas being chosen so that the heptoxide passes to the gas phase and subsequently sublimes onto the carrier. After the sublimation the catalyst may be activated in a stream of hot air.

The carriers may be applied in any suitable form, for instance as powders, flakes, pellets, spheres and extrudates.

Reaction Conditions. The disproportionation of the olefinically unsaturated compounds can advantageously be carried out at a temperature between -20°C-350°C. At too low temperatures the reaction rate is slow, while at too high temperatures, the pressure required is relatively high. With catalysts containing molybdenum oxide or cobalt oxide, the temperature chosen is preferably between 120° and 200°C, while for catalysts containing rhenium heptoxide, molybdenum pentachloride or tungsten hexachloride, temperatures between 10° and 150°C, in particular between 20°C and 75°C, are very suitable.

In general, the olefinic compounds to be disproportionated will already be present in the feed, that is, passed to the disproportionation reaction. It is, however, possible to cause the formation of the olefinic compounds to be disproportionated to take place in the reactor through dehydrogenation of acyclic alkanes. In this embodiment a feed consisting either partly or entirely of acyclic alkanes is contacted with a disproportionation catalyst at a temperature of 300° to 500°C either in the presence or absence of hydrogen. Because at this temperature disproportionation catalysts acts as dehydrogenation catalysts, hydrogen is split off from the alkanes or from a part thereof. According to the invention the alkenes thus formed from the acyclic alkanes can be disproportionated in the presence of the hydrogen formed. Disproportionation catalysts containing molybdenum compounds and/or tungsten compounds are suitable for this specific embodiment of the process.

During the disproportionation reaction the pressure may vary between wide limits. Pressure from about 0.1 to about 500 atmospheres are acceptable; pressures between 0.5 and 250 atm, in particular between 0.9 and 10 atm, are preferred.

The disproportionation may be effected in the presence of both a liquid and a gas phase. If the disproportionation is effected in the liquid phase, the pressure is usually kept at the minimum required to maintain the liquid phase. When the reaction is effected in the liquid phase for the reaction components use may be made of solvents or diluents which under the specific reaction conditions are inert, such as n-pentane, n-octane, n-dodecane, 3-methylpentane, cyclohexane, methylcyclohexane, benzene, and toluene. If the reaction is carried out in the gas phase, gaseous diluents, such as methane, ethane, propane, nitrogen or carbon dioxide may be present. Mixtures of diluents, such as mixture of an aliphatic and an aromatic hydrocarbon may be present.

The space velocity at which the ethylenically unsaturated compounds to be disproportionated are brought into contact with the catalyst is not critical and may very well vary between 0.1 and 50 liters of compounds to be disproportionated per liter of catalyst per hour if the disporportionation is effected in the liquid phase, and between 100 and 5000 liters of compounds to be disproportionated per liter of catalyst per hour if the disproportionation is effected in the gas phase. Space velocities beyond the limits mentioned are not excluded, but are seldom employed.

In a preferred modification, the process is carried out in the presence of elemental hydrogen, because the presence of hydrogen imparts to the catalyst an even longer lifetime and a greater disproportionating activity. Another advantage associated with the presence of hydrogen is that conjugated diene impurities may be present in relatively large amounts without exerting an adverse influence on the catalyst activity. Hence, a thorough removal of these dienes from the feed to be disproportionated is not required if hydrogen is present. Although larger or smaller quantities are not excluded, the amount of elemental hydrogen is generally between 0.01 and 150 percent mole, preferably between 0.1 and 60 percent mole, calculated on the amount of ethylenically unsaturated compounds to be disproportionated.

The disproportionation may be effected batchwise or continuously in the gas phase or in the liquid phase with fixed catalyst beds, suspended catalysts, fluidized catalyst beds, in a reactor provided with a stirring device or with application of another conventional contacting technique. If desired, the reaction mixture may be separated into three fractions with increasing molecular weights. If the lightest and heaviest fractions contain the products desired, the intermediate fraction may be contacted with a second quantity of disproportionation catalyst under conditions that are equal to or different from those which prevail during contact with the first quantity of disproportionation catalyst, while the two catalysts may be the same or different.

On completion of the disproportionation, one or more of the compounds obtained may be subjected to a subsequent conversion process. For instance, a butene-containing mixture, formed by disproportionation of propene, may be passed, together with isobutane, into an alkylation zone for the preparation of gasoline components with a high octane number.

The products may be separated by conventional means, such as by isolation from the reaction mixture by distillation, if required under reduced pressure or by separation of the components of the reaction mixture by cooling the mixture and removing the condensed or crystallized products. Certain fractions, such as unconverted starting materials or fractions in which the number of carbon atoms per molecule differs from that desired, may be recycled to the disproportionation reactor.

The Products. According to the process of the invention, two olefinic reactants are disproportionated to a product comprising olefin(s) having a total number of carbon atoms equal to the sum of the carbon atoms of the two olefinic reactants and having a number of ethylenic linkages equal to the sum of the ethylenic double bonds of the reactants.

In the variation of the process which comprises the disproportionation of two molecules of the same olefinic reactant, the reaction of two molecules of an acyclic olefin of formula (I) generally produces one olefin of a higher carbon number and one olefin of a lower carbon number as depicted in equation (1).

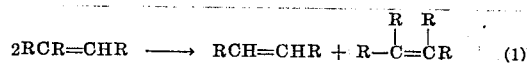

wherein R has the previously stated significance.

The reaction of two molecules of cyclic olefinic reactant of formula (II), however, produces a single cyclic olefin produced as depicted in equation (2)

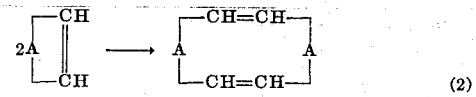

By way of specific illustration, the reaction of two molecules of cyclooctene produces 1,9-cyclohexadecadiene.

Another variation of the process comprises the disproportionation of two different acyclic olefinic reactants. By way of specific illustration; the reaction of 2-butene and 3-hexene produces two molecules of 2-pentene and the reaction of 2-butene with 1,4-polybutadiene produces two molecules of 1,4-polybutadiene having a molecular weight which is less than the molecular weight of the starting 1,4-polybutadiene.

Still another variation of the process is "ring-opening" disproportionation wherein an acyclic olefinic reactant represented by formula (I) is contacted with a cyclic olefinic reactant represented by formula (II). The product of "ring-opening" is a single olefinic compound with one less carbocyclic ring than the cyclic olefinic reactant of formula II. In terms of the formulas I and II, the product is represented by formula (III):

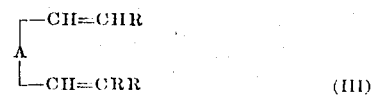

wherein R and A have the previously stated significance. By way of specific illustration, from reaction of 2-butene and cyclopentene is produced 2,7-nonadiene. Other typical products include 2,8-decadiene produced by reaction of cyclohexene and 2-butene, 3,8-undecadiene produced from 3-hexene and cyclopentene, 1,5,9-decatriene produced by reaction of ethylene and 1,5-cyclooctadiene, and 1,4-divinylcyclohexane from ethylene and bicyclo(2.2.2)oct-2-ene.

It is appreciated that an olefinic product produced by any variation of the olefin disproportionation process can undergo further disproportionation with another olefin present in the reaction mixture. For example, 1,6-heptadiene produced from reaction of cyclopentene and ethylene can react with another molecule of cyclopentene to produce 1,6,11,-dodecatriene, and 1,9-cyclohexadecadiene produced from the reaction of two molecules of cyclooctene can react with additional molecules of cyloctene to give a high molecular weight monocyclic polyene.

The products obtained with the aid of the instant disproportionation process may be used for various purposes, depending on their molecular weight, the number of double bonds present, the number of carbon atoms between the double bonds and the position of the double bonds in the molecule.

Thus, cleavage of the double bonds as caused by ozonization leads to the formation of carboxylic acids. In cases where two or more double bonds are present in the molecule dicarboxylic acids may be formed. Dicarboxylic acids may serve as, for instance, starting materials for the preparation of polyesters or polyamides from which synthetic fibers are made.

The products, in particular the low-molecular weight products, may, if desired after partial hydrogenation, be hydrated according to the methods known in the art to mono- or polyhydric alcohols. The products or the compounds obtained by partial hydrogenation may also be converted into alcohols by reaction with carbon monoxide and hydrogen (so-called hydroformylation or oxonation).

The alcohols thus obtained are suitable as starting materials for the preparation of esters which can be used as, for instance, softeners or starting materials for lubricating oil additives. These alcohols can also be used for the preparation of detergents by means of, for instance, sulphation or condensation with ethylene oxide or propylene oxide. Polyhydric alcohols in particular are very suitable for the preparation of alkyd resins and polyurethanes.

To further illustrate the novel disproportionation process and the novel catalyst composition, the following examples are provided. It should be understood that they are not to be regarded as limitations, as the teachings thereof may be varied as will be understood by one skilled in the art.

Catalyst Preparation. Catalysts were prepared which employed a carrier consisting of $\gamma$-aluminum oxide containing less than 0.5%w of sodium, less than 0.01%w of potassium and less than 0.03%w of calcium. The carrier had a pore volume of 0.54 ml/g and a specific surface area of 203 m$^2$/g. The carrier was first heated at 300°C for 2 hours.

Various metals were applied on the carrier by impregnating the latter with a volume of an aqueous solution of a compound of these metals corresponding to 120 percent of the pore volume of the carrier. Subsequently, the impregnated carrier was heated at 120°C for 1 hour and heated in air at 500°C for 2 hours. The salts of the Group IIIa metals applied were nitrates. Rhenium was applied by starting from water in which rhenium heptoxide was dissolved. All the metals were applied separately.

In the Examples the term isopentenes refers to 2-methylbutene-1 and 2-methylbutene-2.

The two types of didymium mentioned in the Examples had the following compositions:

| Constituent | Type A, %w | Type B, %w |
| --- | --- | --- |
| Lanthanium oxide (La$_2$O$_3$) | 42.9 | 7.7 |
| Neodymium oxide (Nd$_2$O$_3$) | 36.4 | 52.3 |
| Praseodymium oxide (Pr$_6$O$_{11}$) | 11.2 | 9.7 |
| Samarium oxide (Sm$_2$O$_3$) | 4.9 | 16.2 |
| Gadolinium oxide (Gd$_2$O$_3$) | 2.4 | 9.5 |
| Cerium oxide (Ce$_2$O$_3$) | 1.5 | 1.7 |
| Yttrium oxide (Y$_2$O$_3$) | 0.7 | 2.7 |

The experiments were performed by passing a gaseous mixture consisting of equimolar amounts of isobutene and 2-butene through a fixed catalyst bed at atmospheric pressure, a temperature of 125°C, and with a space velocity of 1800 liters of gas per kilogram of catalyst per hour. At specified times during the reaction, a portion of the product stream was withdrawn and the conversion of the starting feed of isobutene and 2-butene to products (such as pentenes and propenes) determined as a mole percentage of the sample at the time the sample was taken. The selectivity towards isopentenes is calculated on the basis of the total amount of pentenes formed. The temperature has been chosen high so as to demonstrate the favorable effect of the process with experiments of relatively short duration. Even more favorable results would have been obtained if the experiments had been carried out at a lower temperature, for instance 50°C.

In the Tables of the following examples, the amount, measured as mole per cent, of the starting feed converted to products is designated "Total Conversion;" the mole per cent of the product converted to isopentenes and propenes is designated "Conversion into isopentenes and propene;" and the percentage of isopentene in the pentene fraction is designated "Selectivity towards isopentene."

EXAMPLE I

The carrier contained 0.25 percent of type A didymium (calculated as metals) and 14.0 percent rhenium (calculated as heptoxide). The gas used as starting material also contained 12.5 percent vol of hydrogen. The results are given in Table A.

TABLE A

| | After 1 | 6 | 24 hours, % mole |
| --- | --- | --- | --- |
| Total conversion | 46.8 | 32.9 | 15.9 |
| Conversion into isopentenes and propene | 44.5 | 31.6 | 15.3 |
| Selectivity towards isopentenes | 100 | 100 | 100 |

The experiment was repeated with a catalyst consisting exclusively of 14.0 percent w of rhenium heptoxide on $\gamma$-aluminum oxide. The results are given in Table B.

TABLE B

| | After 0.5 | 1 | 1.5 | 2.5 hours, % mole |
| --- | --- | --- | --- | --- |
| Total conversion | 50.1 | 36.7 | 24.0 | 4.0 |
| Conversion into isopentenes and propene | 47.7 | 34.3 | 21.5 | 1.5 |

Comparison of the results given in Tables A and B demonstrates the favorable effect of didymium on the lifetime of the catalyst.

EXAMPLE II

The experiment described in Example I was repeated with the exception that the carrier contained 1.0%w of Type A didymium. The results are given in Table C.

TABLE C

|  | After 1 | 6 | 24 hours, % mole |
|---|---|---|---|
| Total conversion | 45.7 | 34.0 | 19.1 |
| Conversion into isopentenes and propene | 44.8 | 33.3 | 19.1 |
| Selectivity towards isopentenes | 97.7 | 92.6 | 86.8 |

EXAMPLE III

The experiment described in Example II was repeated with the exception that the carrier contained 1.5 %w of type A didymium. The results are given in Table D.

TABLE D

|  | After 1 | 6 | 24 hours, % mole |
|---|---|---|---|
| Total conversion | 45.2 | 30.0 | 4.7 |
| Conversion into isopentenes and propene | 43.8 | 28.4 | 3.7 |
| Selectivity towards isopentens | >99 | <99 | <99 |

EXAMPLE IV

The experiment in Example I was repeated with the exception that the carrier contained 0.25%w of type B didymium. The results are given in Table E.

TABLE E

|  | After 1 | 6 | 24 hours, % mole |
|---|---|---|---|
| Total conversion | 48.2 | 29.2 | 13.0 |
| Conversion into isopentenes and propene | 43.9 | 27.3 | 12.9 |
| Selectivity towards isopentenes | 97.6 | 95.8 | 90.2 |

EXAMPLE V

The experiment described in Example IV was repeated with the exception that the carrier contained 0.5%w of type B didymium. The results are given in Table F.

TABLE F

|  | After 2.5 | 6 | 24 hours, % mole |
|---|---|---|---|
| Total conversion | 44.8 | 33.9 | 14.4 |
| Conversion into isopentenes and propene | 43.5 | 38.2 | 14.4 |
| Selectivity towards isopentenes | 100 | 100 | 100 |

EXAMPLE VI

The experiment described in Example II was repeated with the exception that the gas used as starting material contained 12.5% vol of nitrogen instead of 12.5% vol of hydrogen. The results are given in Table G.

TABLE G

|  | After 1 | 6 | 24 hours, % mole |
|---|---|---|---|
| Total conversion | 44.3 | 28.5 | 8.6 |
| Conversion into isopentenes and propene | 42.2 | 28.5 | 6.9 |
| Selectivity towards isopentenes | 97.5 | <99 | 100 |

Comparison of the results givin in Tables G and F demonstrates that, in the presence of hydrogen, the catalyst retains its activity over a longer period of time.

EXAMPLE VII

The experiment described in Example I was repeated with the exception that the carrier contained, instead of 0.25%w of didymium, 0.5 percent, of europium. The results are given in Table H.

TABLE H

|  | After 1 | 3 | 4.5 hours, % vol |
|---|---|---|---|
| Total conversion | 45.5 | 35.7 | 37.0 |
| Conversion into isopentenes and propene | 43.6 | 33.2 | 35.3 |
| Selectivity towards isopentenes | <99 | <99 | <99 |

EXAMPLE VIII

The experiment described in Example I was repeated with the exception that the carrier contained, instead of 0.25 percent of didymium, 0.5 percent of cerium. The results are given in Table I.

TABLE I

|  | After 1 | 4.5 | 6 hours, % vol. |
|---|---|---|---|
| Total conversion | 48.3 | 40.1 | 35.9 |
| Conversion into isopentenes and propene | 46.0 | 38.3 | 34.7 |
| Selectivity towards isopentenes | <99 | <99 | <99 |

EXAMPLE IX

The experiment of Example I is repeated except that the catalyst is molybdenum oxide containing type B didymium. The number of hours the catalyst remains active increases.

EXAMPLE X

The experiment of Example I is repeated except that the catalyst is tungsten oxide modified with 0.5 percent of scandium. The active lifetime of the catalyst increases.

We claim as our invention:

1. In the disproportionation of two olefinic hydrocarbon reactants to a product comprising olefinic hydrocarbons having a total number of carbon atoms equal to the sum of the carbon atoms of the two olefinic hydrocarbon reactants and having a number of ethylenic linkages equal to the sum of the ethylenic double bonds of the two olefinic hydrocarbon reactants by contacting the two olefinic hydrocarbon reactants at 10° to 200°C in the presence of an olefin disproportionation catalyst selected from the group consisting of compounds of molybdenum, tungsten and rhenium and mixtures thereof active for olefin disproportionation supported on a carrier of at least 75 percent aluminum oxide, the improvement which comprises modifying the olefin disproportionation catalyst with 0.05 to 5 percent by weight of a modifier selected from the group consisting of an element of Group IIIA of the Periodic Table having an atomic number of from 21 to 71 inclusive, compounds thereof, and mixtures of said elements and said compounds.

2. The process of claim 1 wherein the olefin hydrocarbon reactants are acylic hydrocarbon monoolefins of up to 40 carbon atoms, cyclic hydrocarbon olefins of up to 4 carbocyclic rings, of up to 12 carbon atoms and up to 3 ethylenic linkages, the carbon atoms of at least one ethylenic linkage being members of a carbocyclic ring of at least five carbon atoms and an alkenyl aromatic compound of 8 to 16 carbons having at least one ethylenic linkage in an alpha position to the aromatic ring.

3. The process of claim 1 wherein the olefinic hydrocarbon reactants are isobutene and 2-butene.

4. The process of claim 1 wherein the modifier is selected from the group consisting of cerium, europium and didymium.

5. The process of claim 1 wherein the disproportionation catalyst is rhenium heptoxide and the modifier is didymium.

6. In the disproportionation of two olefinic hydrocarbon reactants to a product comprising olefinic hydrocarbons having a total number of carbon atoms equal to the sum of the carbon atoms of the two olefinic hydrocarbon reactants and having a number of ethylenic linkages equal to the sum of the ethylenic double bonds of the two olefinic hydrocarbon reactants by contacting the two olefinic hydrocarbon reactants at 10° to 200°C in the presence of an olefin disproportionation catalyst selected from the group consisting of rhenium compounds and mixtures thereof active for olefin disproportionation supported on a carrier of at least 75 percent aluminum oxide, the improvement which comprises modifying the olefin disproportionation catalyst with 0.05 to 5 percent by weight of a modifier selected from the group consisting of an element of Group IIIA of the Periodic Table having an atomic number of from 21 to 71 inclusive, compounds thereof, and mixtures of said elements and said compounds.

* * * * *